United States Patent [19]

Sekine et al.

[11] Patent Number: 5,400,339
[45] Date of Patent: Mar. 21, 1995

[54] BIDIRECTIONAL COMMUNICATION APPARATUS FOR REDUCING TRANSMITTED DATA

[75] Inventors: Katsumi Sekine, Gyouda; Toshimasa Fukui, Kawasaki, both of Japan

[73] Assignee: Fujitsu Limited, Kawasaki, Japan

[21] Appl. No.: 32,238

[22] Filed: Mar. 17, 1993

[30] Foreign Application Priority Data

Mar. 18, 1992 [JP]  Japan .................................. 4-062542

[51] Int. Cl.⁶ ......................... H04B 1/66; H04L 12/56
[52] U.S. Cl. ................. 370/94.2; 370/110.1; 370/118; 348/14; 348/16
[58] Field of Search ................. 370/17, 60, 60.1, 58.6, 370/94.1, 94.2, 94.3, 118, 110.1; 379/53, 54, 93, 94, 96; 340/825.5, 825.51; 375/122; 358/133; 348/14

[56] References Cited

U.S. PATENT DOCUMENTS

| | | | |
|---|---|---|---|
| 5,130,985 | 7/1992 | Kondo et al. | 370/94.1 |
| 5,140,417 | 8/1992 | Tanaka et al. | 358/133 |
| 5,282,203 | 1/1994 | Oouchi | 370/94.1 |

Primary Examiner—Wellington Chin
Assistant Examiner—Hassan Kizou
Attorney, Agent, or Firm—Staas & Halsey

[57] ABSTRACT

One of a plurality of subscribers connecting via a communications line a signal line and switching units, each accommodating a subscriber line connected to a terminal, etc., lowers the communication quality of the communications to reduce the cost of communications. A calling or called subscriber issues to a switching unit an instruction to lower the communication quality. A control unit in one of the switching unit receives the instruction, analyzes a method of lowering the communication quality and determining a switching unit for performing it, generates a control signal indicating that the communication quality should be lowered, and sends via a signal line the control signal to the switching unit determined to be used for lowering the communication quality. After receiving the control signal, a polishing unit in that switching unit lowers the communication quality by discarding a part of communication contents of the communications according to the control signal, or lowering the priority of the communication contents. Thus, communications fees can be greatly reduced.

16 Claims, 12 Drawing Sheets

Fig. 12

| POLISHING METHOD / QUALITY OF CALLING TERMINAL | POLISHING = 1 CLP = 1 DISCARD | POLISHING = 2 ALL ARE SET TO CLP = 1 | POLISHING = 3 BAND RESTRICTION |
|---|---|---|---|
| TV TELEPHONE ① <br> IMAGE: CLP=1 <br> VOICE: CLP=0 | NO IMAGES AND NORMAL VOICE | IMAGES AND VOICE ARE LOWERED IN QUALITY IF CONGESTION IS DETECTED IN NETWORK | IMAGES AND VOICE ARE LOWERED IN QUALITY |
| TV TELEPHONE ② <br> VOICE & IMAGE SYNC: CLP=0 <br> OTHER IMAGE ALTERNATELY CLP=0 & CLP=1 | COARSE IMAGES BUT SMOOTH MOTION AND NORMAL VOICE | IMAGES AND VOICE ARE LOWERED IN QUALITY IF CONGESTION IS DETECTED IN NETWORK | IMAGES AND VOICE ARE LOWERED IN QUALITY |
| TV TELEPHONE ③ <br> VOICE: CLP=0 <br> IMAGE ALTERNATELY CLP=0 & CLP=1 | UNSMOOTH MOTION AND NORMAL VOICE | IMAGES AND VOICE ARE LOWERED IN QUALITY IF CONGESTION IS DETECTED IN NETWORK | IMAGES AND VOICE ARE LOWERED IN QUALITY |
| IMAGE TERMINAL <br> VOICE: CLP=0 <br> IMAGE: CLP SET BY SIGNIFICANCE OF EFFECT ON COMMUNICATION | UNCLEAR IMAGES | IMAGES AND VOICE ARE LOWERED IN QUALITY IF CONGESTION IS DETECTED IN NETWORK | IMAGES AND VOICE ARE LOWERED IN QUALITY |

5,400,339

BIDIRECTIONAL COMMUNICATION APPARATUS FOR REDUCING TRANSMITTED DATA

BACKGROUND OF THE INVENTION

1. Field of the Invention

The present invention relates to a communication apparatus using a switching unit, and more specifically to a bidirectional communication apparatus capable of controlling the quality of communication in bidirectional communications operations.

2. Description of the Related Art

With TV telephone communications, one subscriber transmits a picture and a voice to another subscriber, and vice versa. That is, bidirectional communication is performed.

FIG. 1 shows the configuration of the conventional bidirectional communications system.

A switching unit 12 at station A is connected to a switching unit 13 at station B via a communications line. They are connected to subscribers $T_{11}$-$T_{1n}$ and $T_{21}$-$T_{2n}$ respectively. For example, when subscriber $T_{11}$ is connected to subscriber $T_{21}$ at station B through TV telephone, a calling subscriber $T_{11}$ requires high-quality communications through common TV telephone from calling subscriber $T_{11}$ to called subscriber $T_{21}$ and from called subscriber $T_{21}$ to calling subscriber $T_{11}$.

The above described switching units 12 and 13 at stations A and B are ATM switching units used in a broadband area ISDN, and connected to signal units 16 and 17 through control units 14 and 15 respectively. Signal units 16 and 17 transmit, for example, an out-channel signal according to system No. 7 common channel signaling and are connected through a signal line. As known in the art, ATM stands for asynchronous transfer mode, a standard for data communications using fixed length cells, each including a header field of routing information and an information field of data.

A picture and a voice signal outputted by subscriber $T_{11}$ from a TV telephone is applied to a communications line through the switching unit 12 at station A. The signal transmitted through the communications line is applied to the TV telephone of each subscriber $T_{21}$ through the switching unit 13 at station B. Then, the signal transmitted from subscriber $T_{21}$ from a TV telephone is applied to the switching unit 12 at station A from the switching unit 13 through the communications path, and then outputted to subscriber $T_{11}$. The signal transmission is performed through a TV communications line, and other control information is transmitted by the communications method No. 7. For example, a control signal from a terminal such as a TV telephone, etc. is applied by the control unit 14 to a signal line through the signal unit 16. Then, it is applied to the signal unit 17 through the signal line, and transmitted to the control unit 15. A control signal is transmitted to a called terminal in the reverse course. Thus, high quality communications can be performed and controlled through a communications line and a signal line as described above.

When bidirectional communications are performed through a TV telephone line, etc. as described above, uniform communication quality is normally required for both directions equally. However, in mail order systems, etc. using TV telephones, the communication quality of one way does not necessarily have to be the same as that of the other way. For example, a mail order company should send a high quality picture to a consumer when it delivers him a merchandise catalog. However, the consumer does not have to send back an order as a high quality picture. In this case, the communications fee will be reduced if the communication quality can be lowered to some extent for one way. Although the communication quality can be reasonably lowered for one way in the conventional method, high uniform quality communications are performed for both ways, thereby costing an unreasonably large amount.

SUMMARY OF THE INVENTION

The present invention has been developed based on the above described background, and aims at providing a bidirectional communications apparatus capable of reasonably reducing a communications fee by lowering the communication quality for one way.

The present invention relates to a bidirectional communications apparatus for connecting switching units to each other each accommodating a subscriber line having a terminal unit, etc. through a communications line and a signal line so that the subscribers can perform bidirectional communications.

First, the switching unit comprises a control unit for controlling a communication quality degrading process by determining an instruction to lower the communication quality specified at the start of a call by a calling subscriber or a called subscriber, and by notifying the instruction to a switching unit or a subscriber for performing the communication quality degrading process through a signal line (D channel).

Next, the switching unit comprises a polishing unit for degrading the communication quality by discarding a part (some cells) of the contents of communications (entire cells) transmitted through a subscriber line in the communications according to a control signal issued by the control unit.

With the above described configuration of the present invention, the communication quality can be lowered by discarding a part of cells which can be omitted with the communications charge reasonably reduced without severe problems.

BRIEF DESCRIPTION OF THE DRAWINGS

The objects and features of the present invention can be easily recognized by referring to the attached drawings and preferred embodiments explained below.

FIG. 12 is a table indicating the communication quality at a calling terminal and a called terminal as the result of a polishing process.

DESCRIPTION OF THE PREFERRED EMBODIMENTS

Explanation of the Principle

Figure 1:
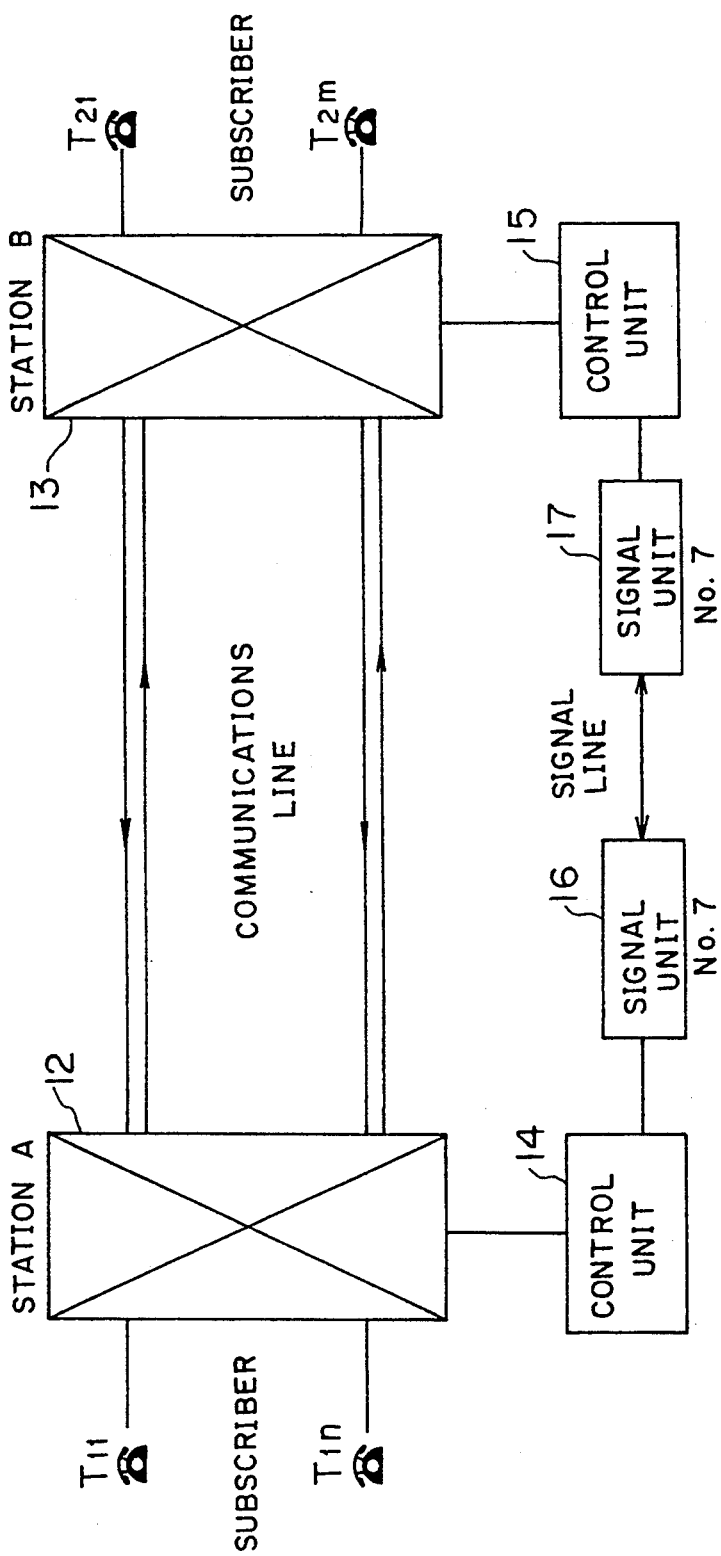
FIG. 1 is a block diagram of the prior art technology.
Figure 2:
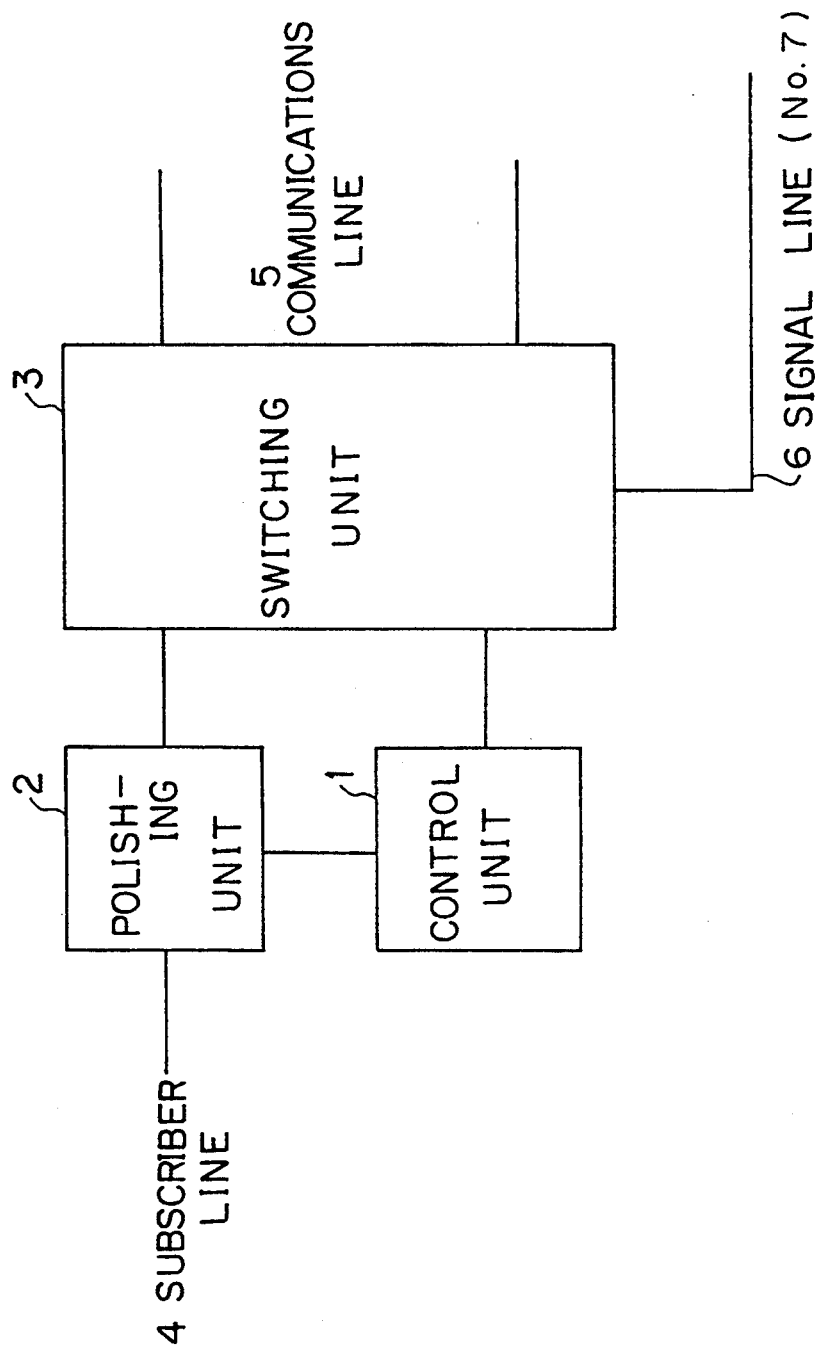
FIG. 2 is a block diagram of the present invention.

FIG. 2 is a block diagram of the principle of the present invention.

The bidirectional communications apparatus according to the present invention comprises a subscriber line 4 connected to a TV telephone, picture terminal, etc., a switching unit 3, a communications line 5 for connecting the switching unit 3 to another switching unit, and a signal line 6 for transmitting a call control signal between two switching units.

A polishing unit 2 connected the subscriber line 4 to the switching unit 3 lowers the communication quality by sending only undiscarded cells to the switching unit 3 after discarding a part of the cells sent from the subscriber line 4 and lowering the priority of a cell sent from the subscriber line 4. Those cells having lower cell loss priority indicated by the header of a cell and those sent over as exceeding a predetermined number of cells are discarded. A process of lowering the priority of a cell is performed such that the value of cell loss priority contained in a header is converted to a value indicating lower priority.

A control unit 1 connected to the above described polishing unit 2 and the switching unit 3 analyzes a control signal sent by the switching unit 3, controls the polishing unit 2 by extracting the control information for a polishing process (discarding of a cell and lowering of its priority). The control information is sent to another switching unit through a signal line (No. 7 channel). The control unit 1 sends the control information on the method of a polishing process (existence of lost cells, condition of discarding cells, existence of a cell having lowered priority) to the polishing unit 2.

The operation of the above described principle is explained below.

First, a calling subscriber terminal accommodated in the subscriber line 4 sets a call. At this time, if a communication quality lowering process (polishing) should be performed, the information as to which switching unit (a calling subscriber's or a called subscriber's) and What kind of polishing process (discard of cells or lowering the priority of a cell) are to be used is given to the switching unit 3. The switching unit 3 provides the information for the control unit 1.

The control unit 1 analyzes the received information, and provides the control information, which specifies the detailed contents of the polishing process, for the polishing unit 2 of a calling subscriber's switching unit if the analysis indicates a polishing process to be performed by the calling subscriber's switching unit.

Based on the received control information, the polishing unit 2 discards a cell or lowers its priority. For example, a cell is discarded according to the control information when a CLP value in the header of a cell equals "1" (indicating low priority), or when the number of transmitted cells is counted and it exceeds a threshold specified by the control information. If the priority of a cell is lowered, the CLP value of a header of a cell is converted to a value of lower priority ("1") according to the control information.

On the other hand, the control unit 1 analyzes the information received from the switching unit 3. If it determines a polishing process to be performed by a called subscriber's switching unit, it provides the polishing control information for a called subscriber's switching unit through a signal line (No. 7 channel). Since a called subscriber's switching unit 3' also comprises a control unit 1' and a polishing unit 2', the called subscriber's switching unit 3' provides the received information for the control unit 1', and the control unit '1 analyzes the information, and provides the control information for the polishing unit 2' as the calling subscriber's control unit 1 does. The polishing unit 2' discards a cell or lowers its priority according to the control information as the calling subscriber's polishing unit 2 does.

Description of Preferred Embodiments

The preferred embodiments of the present invention an explained below by referring to the attached drawings.

Figure 3:
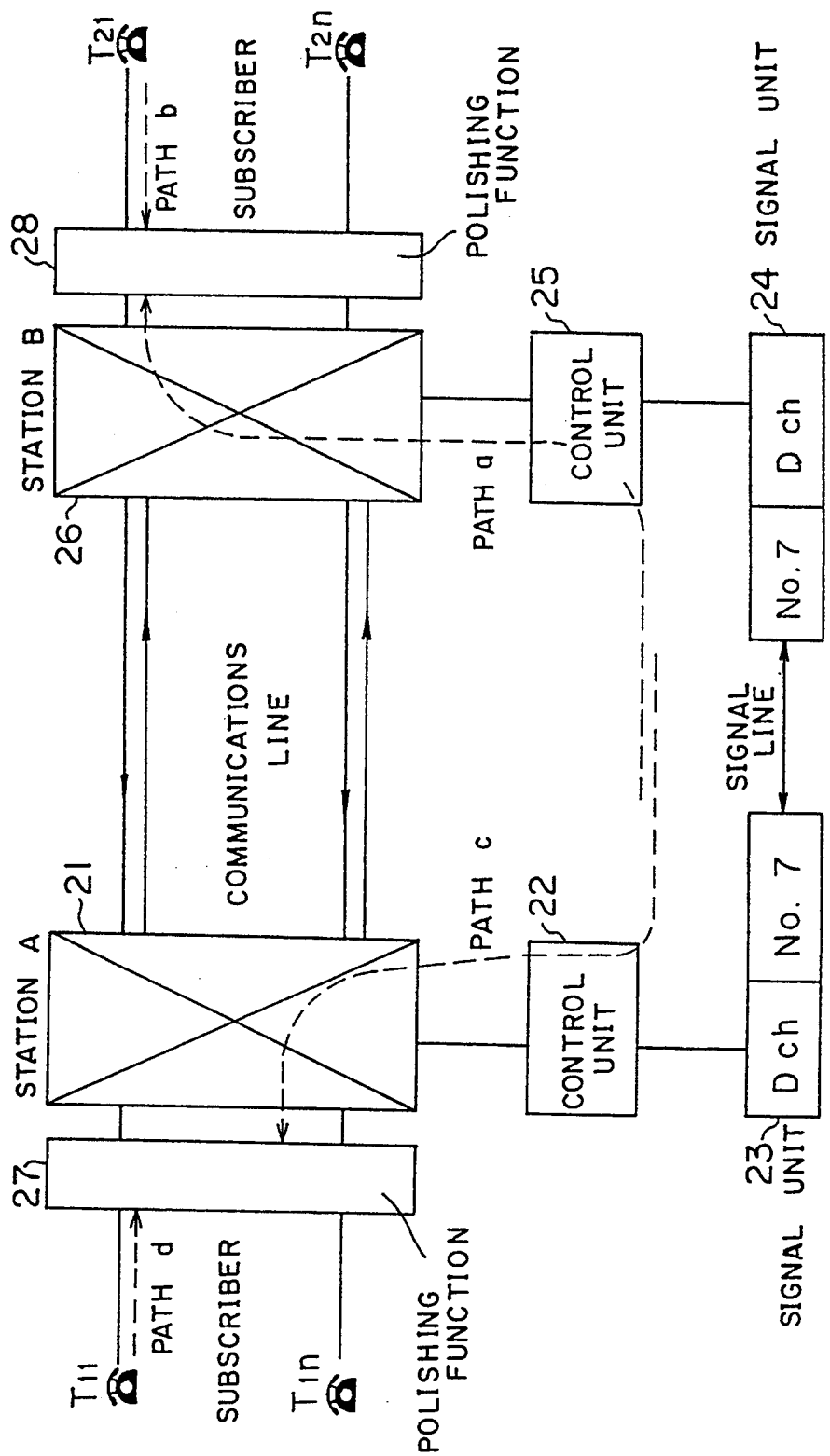
FIG. 3 is a block diagram of a preferred embodiment of the present invention.

FIG. 3 shows the configuration of the embodiment of the present invention. In the configuration illustrated in FIG. 3, polishing functions 27 and 28 are added to conventional bidirectional communications apparatuses, and control functions for controlling the polishing functions 27 and 28 are provided in control units 22 and 25. Each of the polishing functions 27 and 28 is provided in a subscriber's circuit described in detail later.

According to the present configuration, subscribers $T_{11}$-$T_{1n}$ are accommodated by a switching unit 21 at station A, and subscribers $T_{21}$-$T_{2n}$ are accommodated by a switching unit 26 at station B. The switching units 21 and 26 can be, for example ATM switching units. The switching units (for example, station A and station B) are connected to each other via a communications line. The switching units 21 and 26 are also connected to control units 22 and 25 respectively for controlling the switching units and calls. The control units 22 and 25 are connected to signal units 23 and 24 respectively, and the signal units 23 and 24 are connected to each other via a signal line (No. 7 channel). A control signal for controlling a call between the stations A and B is transmitted via the signal line of the system No. 7 common channel signaling method.

The polishing functions 27 and 28 provided for the switching units 21 and 26 respectively discard an ATM cell inputted by a subscriber if a predetermined condition exists, or rewrite a CLP bit in a header of an ATM cell inputted by a subscriber under a predetermined condition. The control units 22 and 25 control the polishing functions 27 and 28 respectively. That is, the control units 22 and 25 determine whether or not a cell is discarded or a CLP bit is rewritten, and furthermore control the conditions for the determination.

Figure 4:
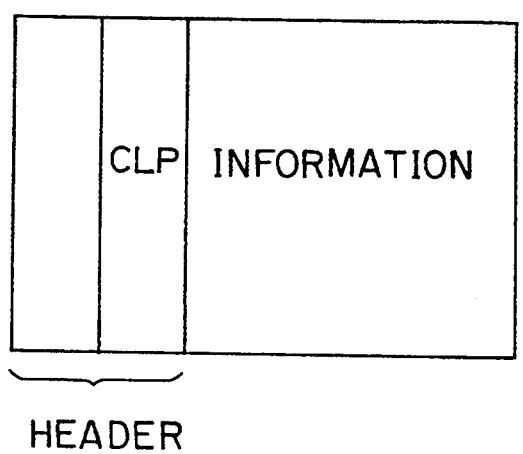
FIG. 4 is the view for explaining an ATM cell.

FIG. 4 shows the format of an ATM cell. An ATM cell comprises a header and information. A CLP bit is contained in the area of the header, and indicates the priority of each cell. "CLP=0" indicates high priority, while "CLP=1" indicates low priority.

That is, the polishing functions 27 and 28 perform a cell discarding process such that a cell having a CLP equal to "1" in its header is discarded, or perform a rewriting process such that the CLP of a cell is rewritten from "0" to "1" if a predetermined condition exists.

Next, the operation of the present embodiment is explained by referring to FIG. 3. Assume that subscriber $T_{11}$ at station A communicates with subscriber $T_{21}$ at station B through TV telephone, and that subscriber $T_{11}$ at station A is a terminal unit of a mail order company and subscriber $T_{21}$ at station B is a consumer. The mail order company sends images of merchandise to the consumer, and the consumer determines whether or not he will buy any of them, and sends back his answer. In this case, a high quality image must be transmitted from $T_{11}$ to $T_{21}$, but does not have to be from $T_{21}$ to $T_{11}$.

Assume that the subscriber $T_{11}$ (mail order company) is a calling subscriber and the subscriber $T_{21}$ (consumer) is a called subscriber. In the setup state where a line between the calling subscriber $T_{11}$ and the called subscriber $T_{21}$ is set, the calling subscriber $T_{11}$ sends the instruction that the quality of the communication from the called subscriber to the calling subscriber should be lowered. At this time, the (setup) signal refers to control information, and an instruction is sent to the polishing function 28 of the switching unit 26 at station B through the No. 7 channel connecting the signal unit 23 to the signal unit 24 via the signal line (through path a shown in FIG. 3) to lower the communication quality under the control of the control unit 22.

On receiving the control signal indicating the instruction to lower the communication quality, the polishing function 28 discards a part of the cells sent from the called subscriber $T_{21}$. The discarding operation is performed after determining the CLP contained in the header of a cell. That is, a cell is discarded if CLP=1, and is sent as is through the switching unit 26 if CLP=0. Through the discarding process, a cell having low priority is not transmitted with a cell having high priority transmitted to the calling subscriber, thereby narrowing the band and reducing the communication fee and the amount of transmitted cells from the called subscriber $T_{21}$ to the calling subscriber $T_{11}$.

According to the explanation above, a cell having the CLP=1 is discarded in the quality lowering process performed by the polishing function 28. Another method of discarding a cell is to discard a part of cells when the called subscriber $T_{21}$ tries to send cells exceeding a predetermined number. A further method of discarding a cell is to send cells through the switching unit 26 after changing the CLP value from 0 to 1. If the CLP value of a cell is changed from 0 to 1, cells having the CLP value of 1 are discarded at a relay station when congestion is detected in the network. Thus, the communication quality may be lowered.

The selection as to which of the above described quality lowering processes is used, and the condition for the selected quality lowering process can be set through path a by the calling subscriber $T_{11}$, or by the terminal of the called subscriber $T_{21}$ (through path b) in response to a setup signal (including an execute instruction to lower the communication quality) sent from the calling subscriber $T_{11}$ to the called subscriber $T_{21}$.

The methods of lowering the communication quality from the called subscriber $T_{21}$ to the calling subscriber $T_{11}$ is described above, but is not limited to those methods. For example, if a called subscriber $T_{21}$ is a terminal unit of a mail order company and a calling subscriber $T_{11}$ is a consumer, then the called subscriber $T_{21}$ may instruct the polishing function 27 of the calling $T_{11}$ to lower the communication quality (path c), and the calling subscriber $T_{11}$ may instruct the polishing function 27 to lower the communication quality (path d). According to these instructions, the amount of data flowing from the calling subscriber to the switching unit 21 at station A can be reduced, thereby lowering the communication quality for one way only.

Figure 5:
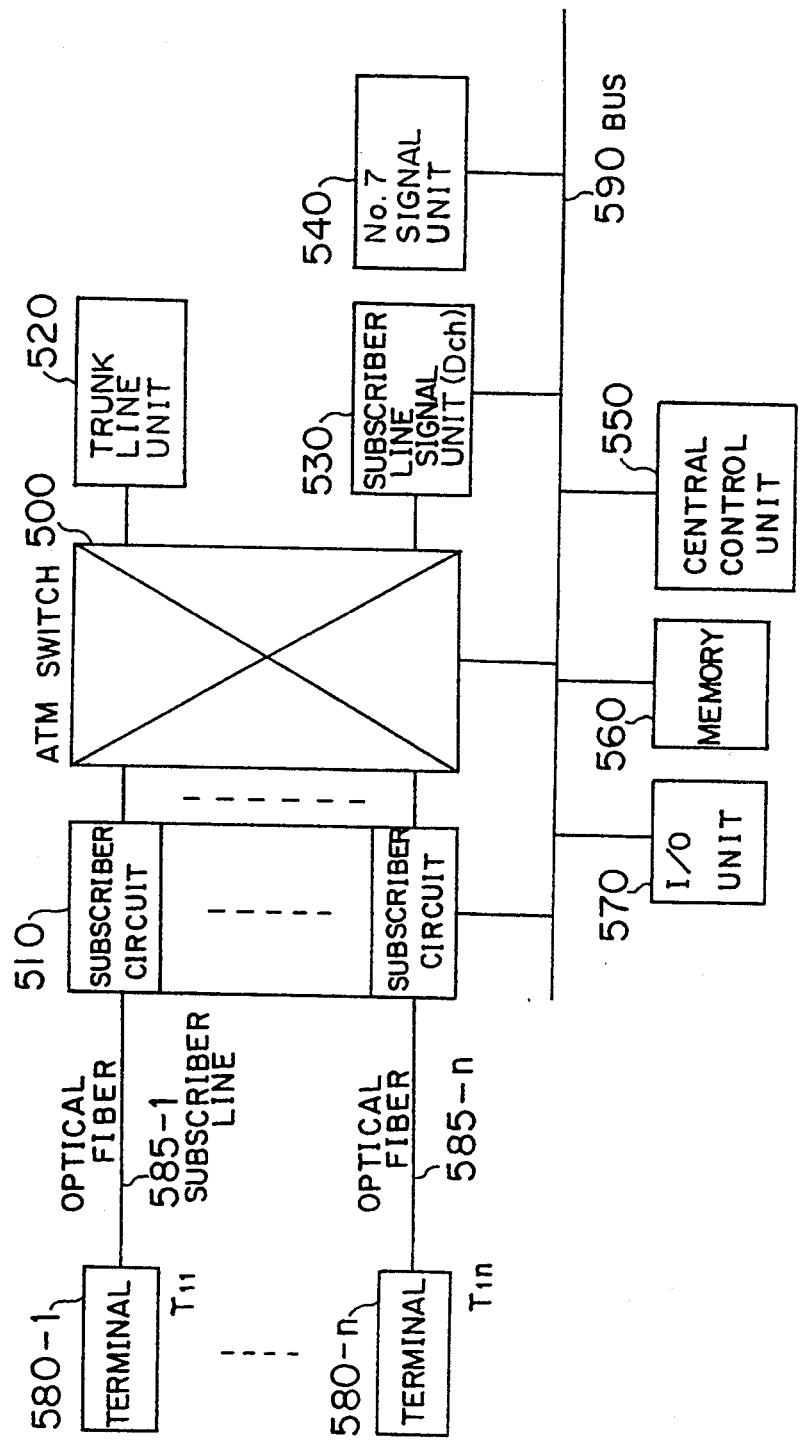
FIG. 5 is a block diagram of an ATM switching unit.

FIG. 5 shows an example of the configuration of the ATM switching unit.

The switching unit comprises an ATM switch 500, a subscriber circuit 510, a trunk line unit 520, a subscriber line signal unit (Dch) 530, a No. 7 signal unit 540, a central control unit 550, a memory 560, an I/O unit 570, etc. Subscriber terminals 580-1, . . . , 580-n are connected to subscriber circuits 510-1, . . . , 510-n via optical fiber subscriber lines 585-1, . . . , 585-n. A control signal for controlling an ATM cell sent from the subscriber terminal 580 and a call first enters the subscriber circuit 510. The subscriber circuit 510 is connected to the ATM switch 500, and the ATM cell sent by the subscriber is applied to the ATM switch 500 for a switch. The subscriber circuit 510 is connected to the ATM switch 500 and a bus 590. The bus 590 is connected to the central control unit 550, the memory 560, the I/O unit 570, the subscriber line signal unit (Dch) 530, the No. 7 signal unit 540, and the ATM switch 500. The subscriber line signal unit (Dch) 530 is connected to the ATM switch 500. A control signal for setting a call, etc. issued by the subscriber terminal 580 is sent to the bus 590 through the subscriber line signal unit (Dch) 530, processed by the central control unit 550, and then transmitted to the switching unit of another station via the No. 7 signal unit 540 through the No. 7 common signaling method.

The polishing function of the present invention is provided in each of the subscriber circuits 510. The polishing function of the subscriber circuit is controlled by the central control unit 550.

Figure 6:
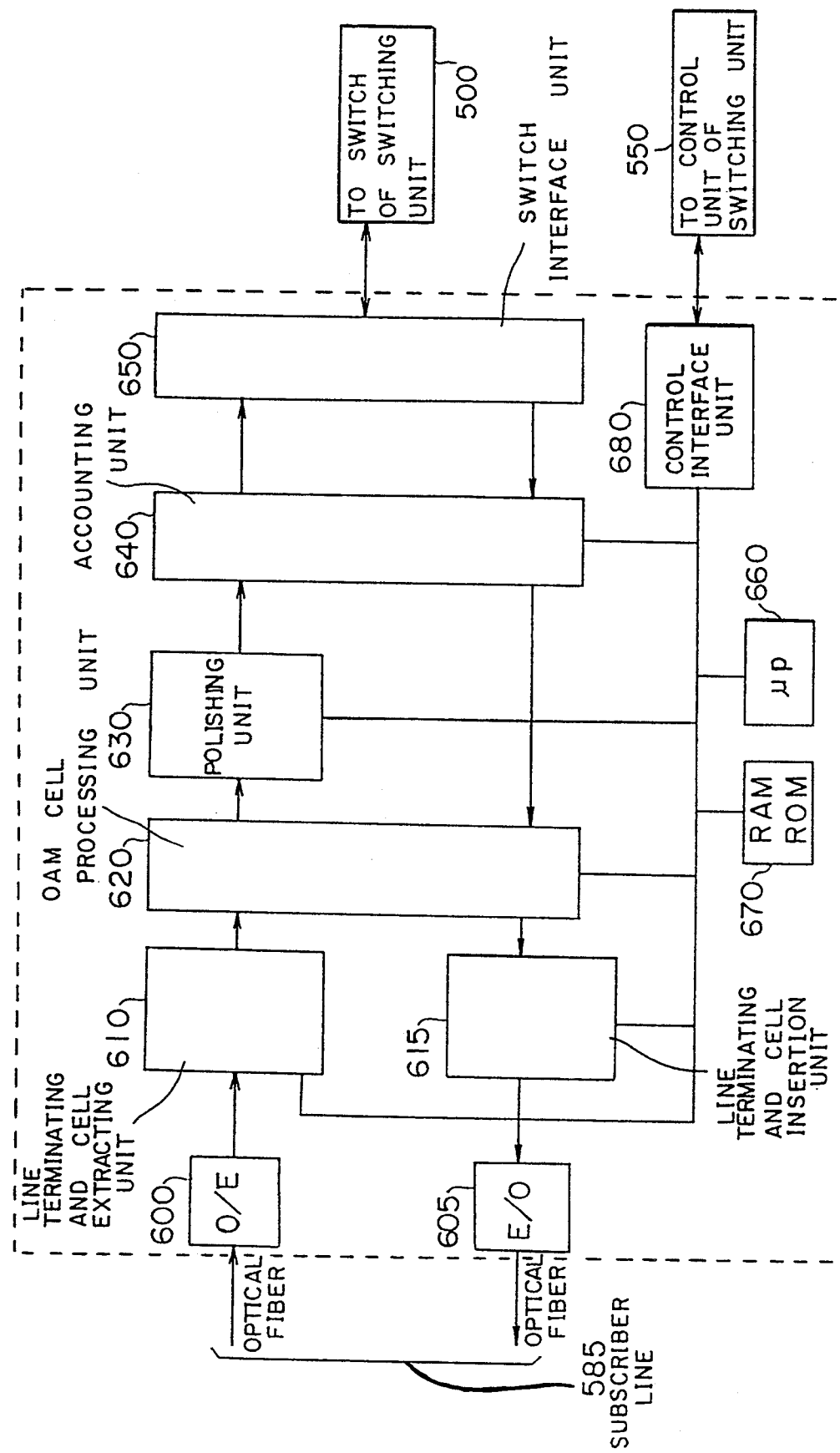
FIG. 6 is a block diagram of the subscriber circuit.

FIG. 6 shows an example of the configuration of the subscriber circuit 510.

As described by referring to FIG. 5, the subscriber circuit 510 is provided between the subscriber line 585 and the ATM switch 500. An optical fiber subscriber line from a subscriber line 585 is first connected to an opto-electrical converter (O/E) 600 to convert an optical signal to an electrical signal. The output of the opto-electrical converter (O/E) 600 is applied to a line terminating and cell extracting unit 610. The line terminating and cell extracting unit 610 terminates a subscriber line, monitors a line error, and extracts an ATM cell sent from the subscriber terminal. The extracted ATM cell is applied to an OAM cell processing unit 620. The OAM cell processing unit 620 processes an ATM cell for maintenance, and the processed cell is applied to a polishing unit 630. The polishing unit 630 monitors and discards the cell transmitted into the network, and the processed cells are provided for an accounting unit 640. The accounting unit 640 counts the number of cells transmitted into the network and obtains the aggregate. The processed ATM cell is outputted to the switch (500 shown in FIG. 5) of the switching unit through a switch interface 650, automatically switched according to its called address, and is outputted to the communications line.

On the other hand, a cell transmitted to the subscriber circuit 510 through the communications line and the switch 500 of the switching unit is received by the subscriber circuit 510 through the switch interface 650, and provided to the accounting unit 640. The accounting unit 640 counts the number of cells transmitted to the subscriber line 585 as described in the transmission from the line 585, and then obtains the aggregate. The cell processed by the accounting unit is further processed as an ATM cell for maintenance by the OAM cell processing unit 620, sent to the subscriber line 585 through a line terminating and cell insertion unit 615 and an electro-optical converting unit (E/O) 605, and sent to the subscriber terminal.

Furthermore, in the subscriber circuit 510 each unit of the subscriber circuit 510 described above (the line terminating and cell extracting unit 610, the line terminating and cell insertion unit 615, the OAM cell processing unit 620, the polishing unit 630, and the accounting unit 640), is controlled using a microprocessor (μP) 660, a RAM and ROM 670 for storing programs and data for the microprocessor (μP) 660, and a control interface unit 680 for interfacing to the central control unit (550 shown in FIG. 5).

The microprocessor (μP) 660 receives a control signal from the central control unit 550 of the switching unit, analyzes the control signal, controls each of the units in the subscriber circuit 510, monitors the state of line errors, and collects accounting information.

As described above, the polishing unit 630 monitors and discarding the cells transmitted from the subscriber line 585 to the network under the control of the microprocessor (μP) 660 which receives a control signal from the central control unit 550.

Figure 7:
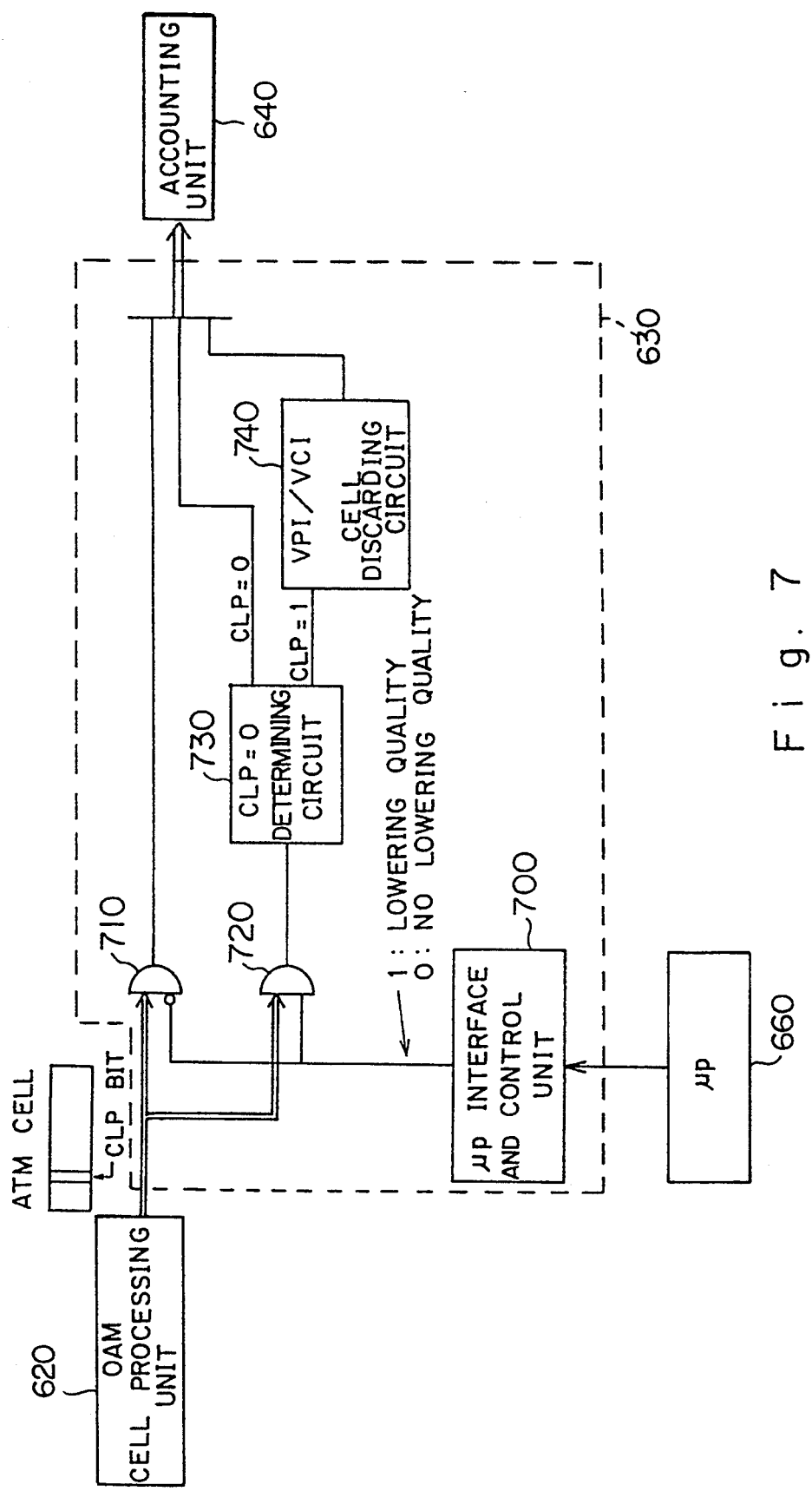
FIG. 7 is a block diagram of the first embodiment of the polishing unit.

FIG. 7 shows a first operational example of the polishing unit 630.

The operational example of the polishing unit 630 discards a cell having the CLP value of "1" (indicating low priority) contained in the header of a cell transmitted through the subscriber line 585.

The polishing unit 630 in the first operational example includes a μP interface and control unit 700 for interfacing to the microprocessor (μP) 660 in the subscriber circuit 510 and controlling the polishing unit 630, two AND circuits 710 and 720, a comparison circuit 730, and a cell discarding circuit 740.

First, a control signal from the microprocessor (μP) 660 is applied to the μP interface and control unit 700. When the μP interface and control unit 700 receives a control signal from the microprocessor (μP) 660 instructing that the communication quality should be lowered, it outputs "1" and otherwise "0", The output of the μP interface and control unit 700 is applied to the two AND circuits 710 and 720. It is applied as an inverse input to the AND circuit 710. The other input to the two AND circuits 710 and 720 is connected to the output of the OAM processing unit 620 for receiving an ATM cell. The output of the AND circuit 710 is connected to the accounting unit 640, and the ATM cell is provided as is for the accounting unit 640 if the output of the μP interface and control unit 700 equals "0" (control signal indicating that the communication quality is not lowered).

On the other hand, the output of the AND circuit 720 is connected to the comparison circuit 730 for determining whether or not a CLP value is "0", and the ATM cell is applied to the comparison circuit 730 when the output of the μP interface and control unit 700 equals "1" (control signal indicating that the communication quality is lowered). The comparison circuit 730 compares the CLP value in the header of an ATM cell with "0", and provides the cell as is for the accounting unit 640 if CLP=0 (indicating that the cell is assigned high priority). By contrast, if CLP=1, it indicates that the cell is assigned low priority, and the cell is transmitted to the cell discarding circuit 740. The output of the cell discarding circuit 740 is connected to the accounting unit 640.

Based on the above described configuration of the circuit, an instruction to lower the communication quality is contained in a setup signal and received by the central control unit 550 in the switching unit when a call is setup. The instruction is analyzed by the microprocessor (μP) 660 in the subscriber circuit 510 and transmitted to the polishing unit 630. Thus, among the cells transmitted from the subscriber line 585 to the subscriber circuit 510, cells having the CLP value of 1 are discarded, while those having the CLP value of 0 are sent to the network.

A called subscriber can specify the discard of a cell having the CLP value of "1" by adding quality lowering information to a setup signal sent by the calling subscriber to the called subscriber's switching unit.

Figure 8:
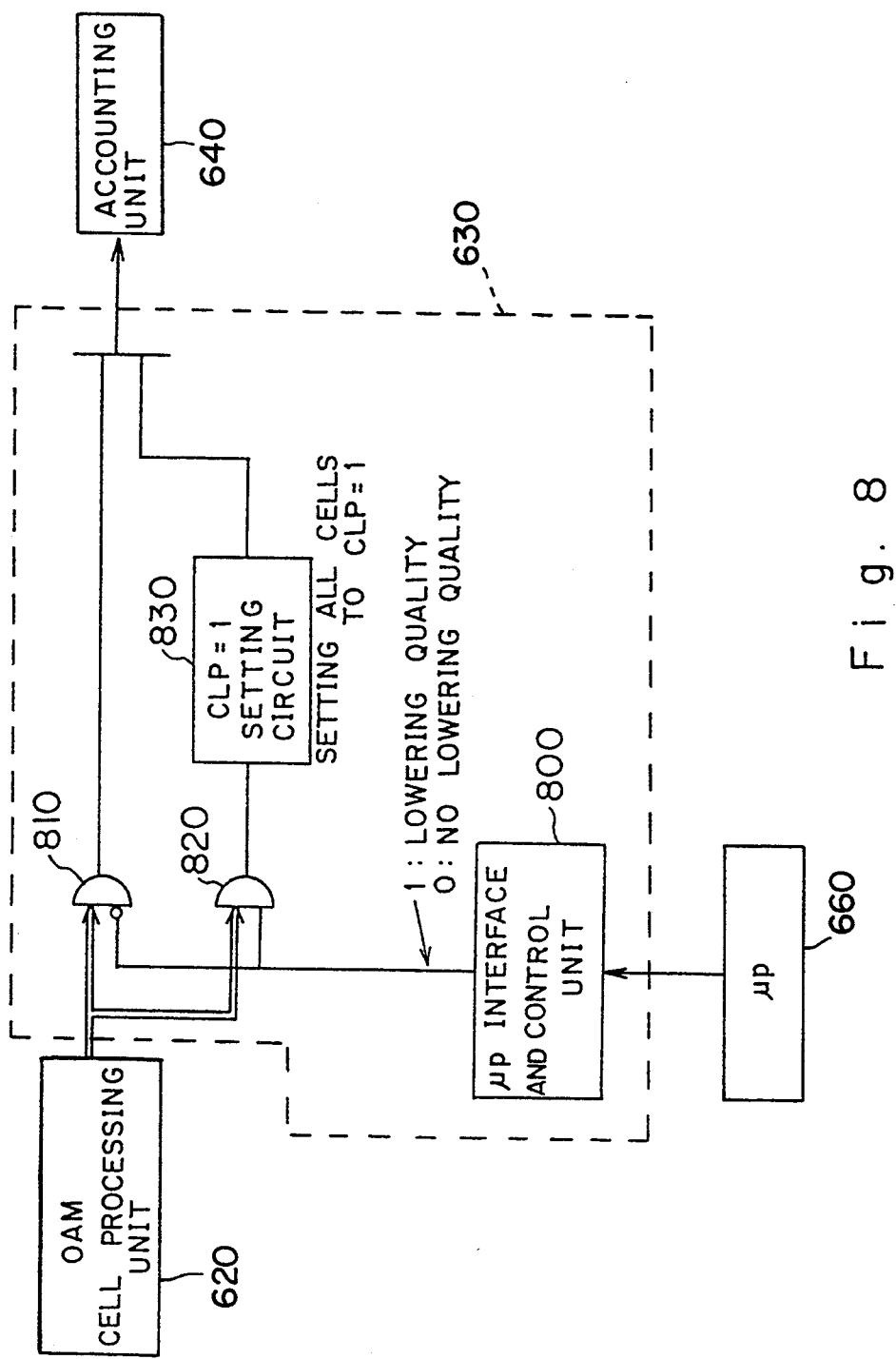
FIG. 8 is a block diagram of the second embodiment of the polishing unit.

FIG. 8 shows a second operational example of the polishing unit 630. The second operational example of the polishing unit 630 sets to "1" the CLP value in the header of a cell transmitted from the subscriber line 585 to lower communication quality.

The polishing unit 630 in the second operational example includes a μP interface and control unit 800 for interfacing with the microprocessor (μP) 660 in the subscriber circuit 510 and for controlling the polishing unit 630, two AND circuits 810 and 820, and a CLP setting circuit 830.

First, a control signal from the microprocessor (μP) 660 is applied to the μP interface and control unit 800. When the μP interface and control unit 800 receives a control signal from the microprocessor (μP) 660 instructing that the communication quality should be lowered, it outputs "1", and otherwise outputs "0". The output of the μP interface and control unit 800 is applied to the two AND circuits 810 and 820. It is applied as an inverse input to the AND circuit 810. The other input to the two AND circuits 810 and 820 is connected to the output of the OAM processing unit 620 for receiving an ATM cell. The output of the AND circuit 810 is connected to the accounting unit 640, and the ATM cell is provided as is for the accounting unit 640 if the output of the μP interface and control unit 800 equals "0" (control signal indicating that the communication quality is not lowered).

On the other hand, the output of the AND circuit 820 is connected to the CLP setting circuit 830 for setting the CLP value is "1", and the ATM cell is applied to the CLP setting circuit 830 when the output of the μP interface and control unit 800 equals "1" (signal indicating that the communication quality is lowered). The CLP setting circuit 830 sets the CLP value in the header of an ATM cell to "1", and provides the processed cell for the accounting unit 640.

In the second example of the polishing unit 630, an instruction to lower the communication quality is contained in a setup signal and received by the central control unit 550 in the switching unit when a call is set. The instruction is analyzed by the microprocessor (μP) 660 in the subscriber circuit 510 and transmitted to the polishing unit 630. Thus, the CLP value of all of the cells transmitted from the subscriber line 585 to the subscriber circuit 510 is set to "1" and the cells are transmitted via the network.

Thus, the CLP value of a cell to be transmitted from the called subscriber to the calling subscriber may be set to "1" in response to quality lowering information in a setup signal transmitted by a calling subscriber to a called subscriber's switching unit. As a result, the communication quality is lowered by discarding the cells having the CLP value of "1" at a relay station when congestion is detected in the network by the switching unit at the relay station.

Furthermore, the CLP value of a cell transmitted by a calling subscriber to the network can be set to "1" by the calling subscriber's issuing a quality lower instruction for the polishing function of the calling subscriber's switching unit.

FIGS. 9A and 9B show a third operational example of the polishing unit 630. The third operational example of the polishing unit 630 discards cells as an overflow from a band when the number of cells transmitted from the subscriber line 585 exceeds a predetermined number.

The third operational example of the polishing unit 630 includes a $\mu$P interface and control unit 900 for interfacing to the microprocessor ($\mu$P) 660 in the subscriber circuit 510 and controlling the polishing unit 630, two AND circuits 910 and 920, a band determining circuit 930, and a cell discarding circuit 940 (FIG. 9A). The band determining circuit 930 comprises a passage-admitted cell counter 950, a band information register 960, a comparison circuit 970, and two AND circuits 980 and 990.

First, information as to whether or not a quality lowering process is performed and a control signal of band restriction information if the quality lowering process is to be performed are applied by the microprocessor ($\mu$P) 660 to the $\mu$P interface and control unit 900. The $\mu$P interface and control unit 900 outputs to the two AND circuits 910 and 920 a "1" when it receives a control signal instructing the quality lowering process from the microprocessor ($\mu$P) 660, and otherwise outputs a "0". If the quality lowering signal equals "1", a threshold indicating the number of acceptable cells is sent to the band determining circuit 930. The threshold is set to the band information register 960 in the band determining circuit 930.

The outputs of the $\mu$P interface and control unit 700 are applied to the two AND circuits 910 and 920. The output is applied to the AND circuit 910 as an inverse input. The other input to the two AND circuits 910 and 920 is connected to the output of the OAM processing unit 620 to receive an ATM cell. The output of the AND circuit 910 is connected to the accounting unit 640. If the output of the $\mu$P interface and control unit 900 equals "0" (indicating a no quality lowering control signal), then the ATM cell is provided as is for the accounting unit 640.

The output of the AND circuit 920 is connected to the passage-admit-ted cell counter 950 and the two AND circuits 980 and 990 in the band determining circuit 930, and an ATM cell is applied to the band determining circuit 930 if the output of the $\mu$P interface and control unit 900 equals "1" (control signal indicating that the communication quality is to be lowered). In the band determining circuit 930, the passage-admitted cell counter 950 first refers to the header of a cell, counts the number of cells transmitted from a calling subscriber to a called subscriber, and then outputs a count value. The output is applied to the comparison circuit 970 as input A. The other input B of the comparison circuit 970 is connected to the band information register 960, and the comparison circuit 970 compares the number of passed cells (input A) with a band restriction threshold (input B). If the number of passed cells (input A) is equal to or smaller than the threshold (input B) (where the number of passed cells is within the band restriction), "1" is outputted to the terminal indicating $A \leq B$, while "0" is outputted to the terminal indicating $A > B$. If the number of passed cells (input A) is larger than the threshold (input B) (where the number of passed cells is within the band restriction), "0" is outputted to the terminal indicating $A \leq B$, while "1" is outputted to the terminal indicating $A > B$. The output of the terminal indicating $A \leq B$ of the comparison circuit 970 is applied as the other input to the AND circuit 980, and the output of the terminal indicating $A > B$ of the comparison circuit 970 is applied as the other input to the AND circuit 990. If the number of passed cells is within the band restriction, the terminal indicating $A \leq B$ equals "1" and the AND circuit 980 outputs received cells. The outputted cells are provided for the accounting unit 640. On the other hand, if the number of passed cells exceeds the band restriction, the terminal indicating $A > B$ equals "1", and the AND circuit 990 outputs received cells. The output is connected to the cell discarding circuit 940, and the cell discarding circuit 940 empties the headers and information of the outputted cells, and outputs these empty cells to the accounting unit 660.

According to the third operational example described above, when a call is set, the central control unit 550 in the switching unit receives an instruction to lower the communication quality contained in a setup signal. The instruction is analyzed by the microprocessor ($\mu$P) 660 of the subscriber circuit 510 and provided for the polishing unit 630. Thus, among the cells transmitted from the subscriber line 585 to the subscriber circuit 510, the cells exceeding the band restriction are discarded before being provided for the network. A band restriction threshold can be determined at the setup of a call.

A variation of the third operational example is that the CLP determining circuit (730 shown in FIG. 7) is inserted to the output "beyond the band restriction" of the band determining circuit 930, and all cells having the CLP value of "1" (low priority) are discarded.

The discard of cells exceeding the band restriction can be performed by a calling subscriber, called subscriber, or relay station by providing the control information to the switching unit of the calling subscriber, called subscriber, or the relay station when a call is set up.

Although three operational examples of the polishing unit 630 are described above, the polishing unit 630 is not limited to these examples. For example, these three types can be combined to optionally select any polishing function by sending, at the setup of a call, control information as to which polishing function should be used.

Figure 10:
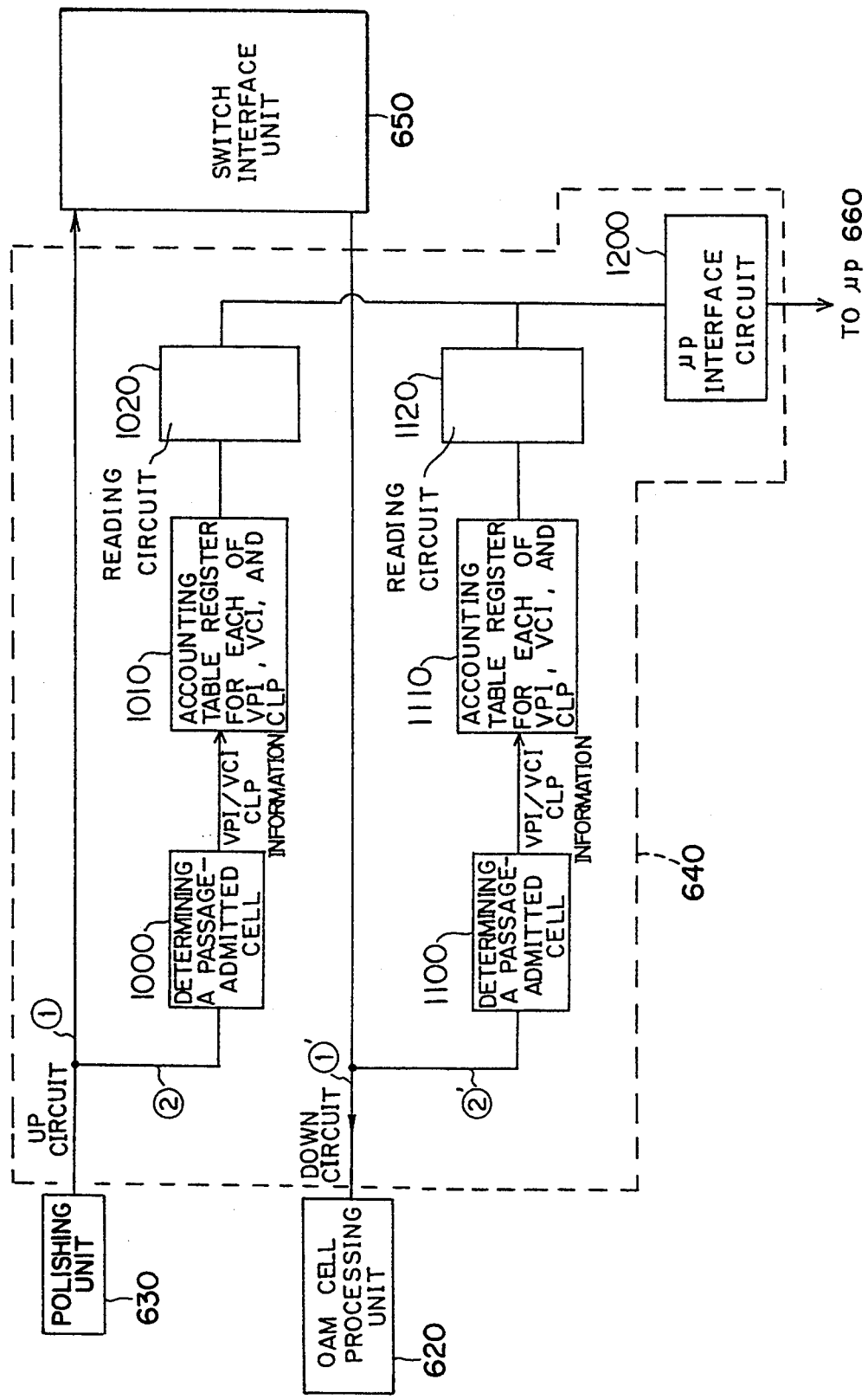
FIG. 10 is a block diagram of the accounting process.

FIG. 10 shows an example of the configuration of the accounting unit 640. A pair of accounting circuits are in the accounting unit 640, an up-circuit for sending cells inputted by a calling subscriber to the network, and a down-circuit for sending cells from the network to a called subscriber. That is, the up-circuit transmits the input from the polishing unit 630 to the switch interface unit 650 (①), counts the cells inputted from the polishing unit 630, and performs an accounting process (②). The accounting process ② is performed by a passage-admitted cell determining circuit 1000, an accounting table and register 1010, and a reading circuit 1020. The passage-admitted cell determining circuit 1000 determines whether or not an input cell is admitted. If yes, accounting information is generated for a virtual pass identifier (VPI), a virtual channel identifier (VCI), and the CLP, and separately stored in the accounting table and register 1010. The reading circuit 1020 separately reads a VPI, VCI, and CLP from the accounting table and register 1010.

The circuit is configured likewise in the down-circuit. That is, the cells inputted by the switch interface unit 650 are transmitted as is to the OAM cell processing unit 620 ((①)'), and then counted and processed in an accounting operation ((②)'). The accounting operation e,crc/2/' is performed by a passage-admitted cell determining circuit 1100, an accounting table and register 1110, and a reading circuit 1120, essentially the same process as in the up-circuit.

In addition to the above described components the accounting unit 600 further comprises a $\mu P$ interface circuit 1200 for interfacing to the microprocessor ($\mu P$) 660. At a request from the microprocessor ($\mu P$) 660, the reading circuits 1020 and 1120 read the contents of the accounting table and register 1010 and 1110, and provide the accounting information for the microprocessor ($\mu P$) 660 through the $\mu P$ interface circuit 1200.

Figure 11:
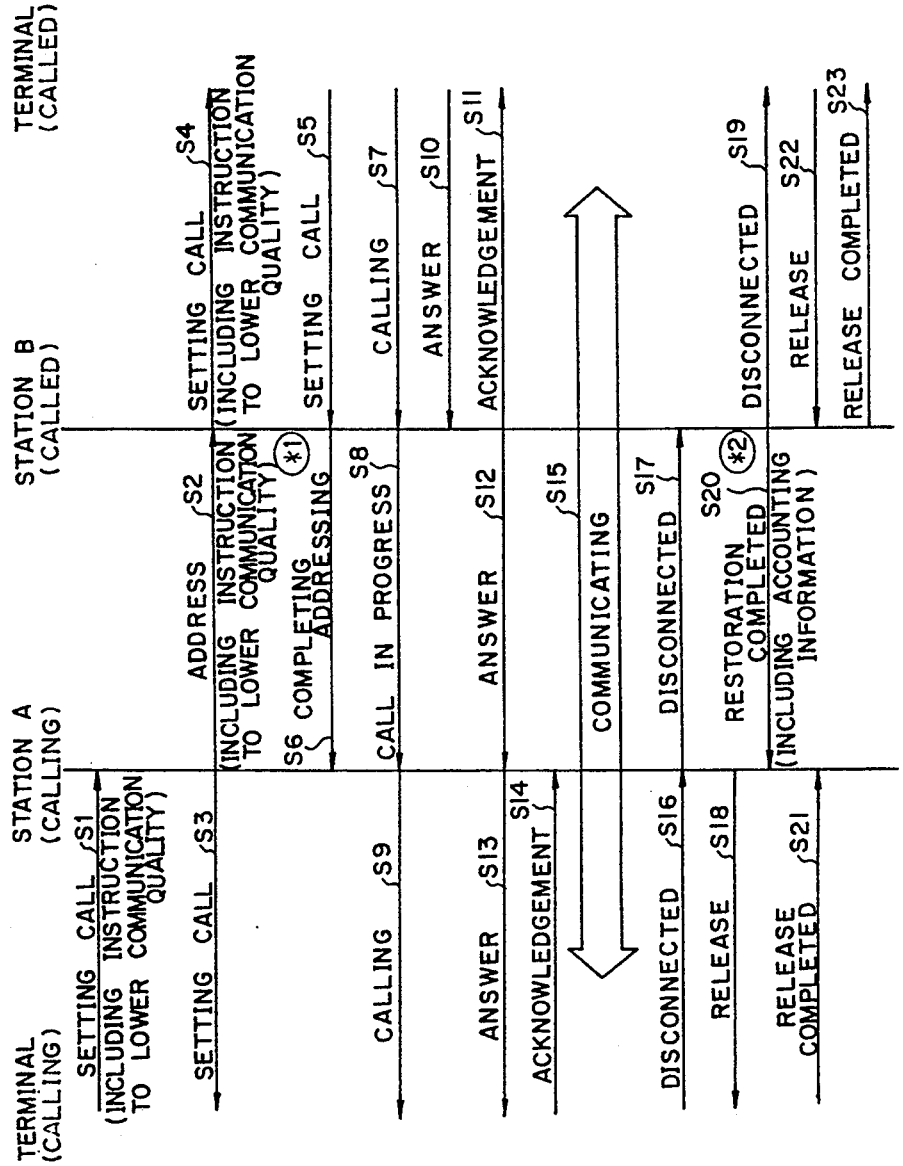
FIG. 11 is a signal timing diagram for explaining the call control sequence.

FIG. 11 is a signal timing diagram for explaining an example of the call control sequence. First, the general call control sequence in the ISDN is explained below. A calling subscriber's terminal issues to a calling subscriber's switching unit (station A) a request message for setting a call (SETUP) during a call setting process (s1). A switching unit at station A receives the message, issues to a called switching unit (at station B) a request for setting a call, notifies it of the address (s2), and sends to the calling terminal a message that a call is being set (CALL PROC) (s3). The called switching unit (at station B) receives the request for setting a call (s2), and sends to the called terminal a request message for setting a call (s4). The called terminal receives the message, performs a call setting process, and sends to the switching unit at station B a message indicating that a call is being set (CALL PROC). When station B starts a call setting process to the called terminal, it sends to station A information that the called terminal address information has been received (s6).

The called terminal sends to station B a message informing that a call is being made (ALERT) (s7). In response to this, station B sends to station A a signal indicating that an event of setting a call has arisen (s8), and station A sends to the calling terminal a message informing that a call is being made (ALERT) (s9). When the called terminal answers, its message (CONN) is sent to station B (s10), and station B sends to the called terminal an acknowledgement message (CONN ACK) (s11), and sends to station A a signal indicating that an answer has been received (s12). Station A sends to the calling terminal an answer message (CONN) (s13). In response to this, the calling terminal sends an acknowledgement message (CONN ACK) (s14). Thus, the communication is ready to start (s15).

To terminate the communication, the calling terminal issues to station A a disconnection request message (DISC) (s16), and station A sends to station B a disconnection request signal (s17), and sends to the calling terminal a release message (REL) (s18). Station B sends to the called terminal a disconnection request message (DISC) (s19), and sends to the switching unit at station A a notification that the call has been released (restoration completed) (s20). The called terminal receives the disconnection request message (DISC) and sends a message informing that the call is to be released (REL) (s22), and the switching unit at station B sends to the called terminal a release completion message (REL COM) (s23). The calling terminal sends to the switching unit at station A a release completion message (REL COM) when the call is released (s21). Thus, the communication between the calling subscriber accommodated in station A and the called subscriber accommodated in station B terminates.

In the above described call control sequence, a communication quality lowering process is performed as follows.

If the calling subscriber instructs to lower the communication quality, it sends to station A communication quality instruction information when it sends a message informing that a call is to be set (s1). If the subscriber instructs the calling switching unit (station A) to lower the communication quality, then a polishing function is set at station A, and station A performs the communication quality lowering process.

If the calling subscriber instructs the called switching unit (station B) to lower the communication quality, then the central control unit of the switching unit at station A analyzes the communication quality instruction information sent by the calling subscriber, and sends the result together with an address as additional call setting information to the switching unit at station B (s2). The switching unit at station B informs, in its call setting message to be sent to the called subscriber, that it has received a communication quality instruction from the calling subscriber (s4). If the called subscriber must send a communication quality instruction, then it sends to station B a message informing that a call is being set with communication quality instruction information included in the message (s5). Thus, a polishing function has been set at station B, and station B lowers the communication quality.

The communication quality lowering process is released when a call is disconnected. That is, the quality control for the call is released when station B sends to the called subscriber a disconnection message (s19) and sends to station A a restoration completion signal (s20). The restoration completion signal (s20) contains the accounting information obtained from the accounting unit in the called switching unit.

The above described call control sequence permits a control signal for use in controlling communication quality to be sent.

Although the explanation above refers to no relay stations, a call is likewise controlled in case a relay station is provided. That is, the calling subscriber includes communication quality instruction information in a call setting message (SETUP), and station A sends to the relay station the communication quality instruction information as an additional call setting information in addition to an address. The relay station provides the control signal for station B. Thus, the communication quality lowering process can be performed by station B.

Finally, the quality obtained by the quality control process performed on a TV telephone and a picture terminal accommodated in an ATM switching unit is explained as follows.

FIG. 12 is a table showing the communication quality at a calling terminal where a polishing process is performed, and the quality obtained by different polishing processes performed by different polishing methods, FIG. 12 shows the communication quality data of three TV telephones and one picture terminal obtained when the data are sent from a calling terminal. In TV telephone ①, each image information cell is assigned the CLP value "1" as a low priority cell, while each voice information cell is assigned the CLP value "0" as a high priority cell. In TV telephone ②, each image synchronization information cell is assigned the CLP value "0" indicating high priority, other image information is alternately assigned "0" and "1" as each CLP value, and a voice information cell is assigned the CLP value "0". In TV telephone ③, image information is segmented and put in frames, each frame alternately being assigned the CLP values "1" and "0" and each voice information cell being assigned the CLP value "0". In the picture terminal, picture information is sent after being encoded. A, a progressive encoding process such as JPEG is performed, where low priority data affecting picture quality are assigned the CLP value "0", while high priority data not much affecting picture quality are assigned the CLP value "1". Thus, the communication quality is individually determined by each of the four types of transmission terminals.

Figure 9:
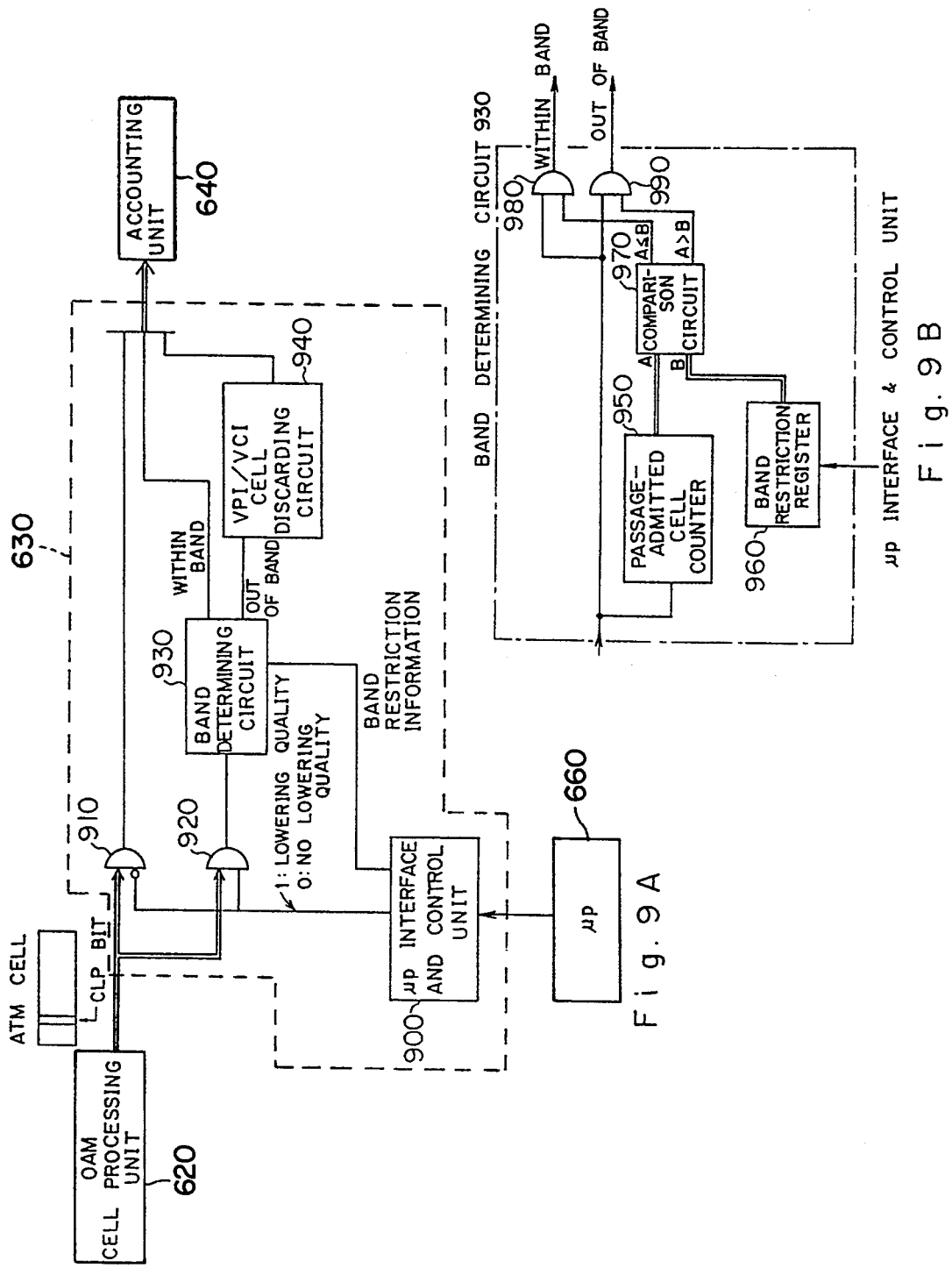
FIGS. 9A and 9B are block diagrams of the third embodiment of the polishing unit.

Concerning the polishing method, three methods are provided as shown in FIGS. 7, 8, and 9. That is, polishing method 1 discards a cell having the CLP value "1" as shown in FIG. 7, polishing method 2 converts the CLP value of all cells to "1" as shown in FIG. 8, and polishing method 3 places a band restriction as shown in FIG. 9.

If polishing method 1 is used (discarding a cell having the CLP value "1"), no images appear on TV telephone ① because all image cells are discarded, while the voice information maintains the quality at the calling unit. With TV telephone ②, the motion of images appears smooth because synchronization information affecting the quality of image information is not lost. However, since half of other image information is discarded, images appear coarse. With TV telephone ③, a frame in which all cells are transmitted and a frame in which all cells are discarded are arranged alternately. Therefore, the motion of images appear unsmooth although the voice information maintains the quality of the calling unit. With the picture terminal, information cells assigned high priority during a progressive encoding process can be discarded. Therefore, pictures appear less clear than when they leave their calling unit.

If polishing method 2 is used (the CLP value of all cells is compulsorily converted to "1"), the quality of images, voice, and pictures at a calling terminal is not different from that at a called unit regardless of the quality obtained at the calling terminal (TV telephones ①, ②, and ③, and the picture terminal) if data are transmitted via a relay station and if no congestion is detected in the network. However, the quality of the images, voice, and pictures are lowered due to the discard of cells if congestion arises in the network.

If polishing method 3 is used (band restriction), excess cells (exceeding a predetermined number) are discarded. Accordingly, the quality of images, voice, and pictures is lowered in TV telephones ①, ②, and ③, and the picture terminal.

As described above, the communication quality can be controlled by changing the quality at a calling terminal and selecting a polishing method. Thus, the cost of communication can be greatly reduced by lowering communication quality.

What is claimed is:

1. A bidirectional communications system for controlling bidirectional communication of information among subscribers, comprising:
   control means, for extracting and analyzing instruction information specified in a call setting process by one of a calling subscriber and a called subscriber to lower communication quality, and for generating a control signal indicating a communication quality lowering process, and
   polishing means for lowering communication quality in response to receipt of the control signal by one of discarding a part of the information transmitted in a calling process and lowering a transmission priority of the information.

2. The bidirectional communications system according to claim 1, further comprising a signal line, operatively connected to said control means, for transmitting the control signal indicating the communication quality lowering process.

3. A bidirectional communications apparatus in a network for controlling bidirectional communication of fixed length cells among subscribers, each fixed length cell having a header field of routing information, an information field of data and a cell loss priority determining priority of transmission, said bidirectional communications apparatus comprising:
   control means, for extracting and analyzing instruction information specified in a call setting process by one of a calling subscriber and a called subscriber to lower communication quality, and for generating a control signal indicating a communication quality lowering process, and
   polishing means for lowering communication quality in response to receipt of the control signal by one of discarding a part of specified priority cells included among the fixed length cells and lowering the cell loss priority of all of the fixed length cells transmitted by one of the calling subscriber and the called subscriber.

4. The bidirectional communications apparatus according to claim 3, further comprising a signal line, operatively connected to said control means, for transmitting the control signal indicating the communication quality lowering process.

5. The bidirectional communications apparatus according to claim 3, wherein said polishing means lowers the communications quality by detecting and discarding each of the fixed length cells having the cell loss priority of "1" in response to receipt of the control signal generated by said control means.

6. The bidirectional communications apparatus according to claim 5, wherein the bidirectional communications apparatus is connected to a TV telephone subscriber terminal producing image cells and voice cells included in the fixed length cells, and
   wherein said polishing means discards each of the image cells having the cell loss priority of "1" in response to receipt of the control signal generated by said control means and sends only the voice cells to the called subscriber when the TV telephone subscriber terminal assigns the cell loss priority of "1" for the image cells and the cell loss priority of "0" for the voice cells.

7. The bidirectional communications apparatus according to claim 5, wherein the bidirectional communications apparatus is connected to a TV telephone subscriber terminal outputting as the fixed length cells image cells having the cell loss priority of "0" when associated with synchronization of images and having the cell loss priority of "0" and "1" alternately in all other image cells, and voice cells having the cell loss priority of "0", and wherein said polishing means discards the image cells having the cell loss priority of "1" in response to receipt of the control signal.

8. The bidirectional communications apparatus according to claim 5, wherein the bidirectional communications apparatus is connected to a TV telephone subscriber terminal producing the fixed length cells including voice cells assigned the cell loss priority of "0" and image cells for frames of images, the frames alternately assigned the cell loss priorities of "0" and "1", and wherein said polishing means discards the image cells having the cell loss priority of "1" in response to the control signal generated by said control means and sends to the called subscriber coarse-in-motion-and-density image cells and non-quality-lowered voice cells.

9. The bidirectional communications apparatus according to claim 5, wherein the bidirectional communications apparatus is connected to a picture terminal producing, among the fixed length cells, picture information cells encoded by a progressive encoding process, the cell loss priority of "0" assigned to the picture information cells significantly affecting the communication quality, and the cell loss priority of "1" assigned to the picture information cells not significantly affecting the communication quality.

10. The bidirectional communications apparatus according to claim 3, further comprising switching units operatively connected to said control means, said polishing means and each other, for routing the fixed length cells between the calling subscriber and the called subscriber, wherein said control means generates the control signal including information that the communication quality should be lowered and setting information on a number of passage-admitted cells, and wherein said polishing means lowers the communication quality by counting the number of the fixed length cells transmitted to a corresponding switching unit in response to receipt of the control signal generated by said control means, and discards all of the fixed length cells in a single transmission after the number counted exceeds the number of the passage-admitted cells.

11. The bidirectional communications apparatus according to claim 10, wherein the bidirectional communications apparatus is connected to a TV telephone subscriber terminal producing image cells and voice cells included in the fixed length cells, and wherein said polishing means sends to the called subscriber quality-lowered image and voice cells after discarding excess image and voice cells in response to the control signal generated by said control means if the number of the image and voice cells exceeds the number of passage-admitted cells.

12. The bidirectional communications apparatus according to claim 10, wherein the bidirectional communications apparatus is connected to a picture terminal producing picture cells included in the fixed length cells, and wherein said polishing means sends to the called subscriber picture-quality-lowered information after discarding excess picture cells in response to receipt of the control signal generated by said control means if the number of the picture cells exceeds the number of passage-admitted cells when the picture terminal subscriber produces pictures.

13. The bidirectional communications apparatus according to claim 3, wherein the network performs a cell discarding process for the fixed length cells having a low cell loss priority when congestion is detected, and wherein said polishing means lowers the communication quality by lowering the cell loss priority of each of the fixed length cells.

14. The bidirectional communications apparatus according to claim 13, wherein the bidirectional communications apparatus is connected to a TV telephone subscriber terminal producing image cells and voice cells included in the fixed length cells, and wherein said polishing means assigns the cell loss priority of "1" to the image and voice cells in response to receipt of the control signal generated by said control means.

15. The bidirectional communications apparatus according to claim 13, wherein the bidirectional communications apparatus is connected to a picture terminal producing picture cells included in the fixed length cells, and wherein said polishing means assigns the cell loss priority value of "1" to the picture cells in response to receipt of the control signal generated by said control means.

16. The bidirectional communications apparatus according to claim 3, wherein said control means receives from one of the calling subscriber and the called subscriber a signal indicating which of discarding the specified priority cells and lowering the cell loss priority is used by said polishing means to lower the communication quality.

* * * * *

UNITED STATES PATENT AND TRADEMARK OFFICE
CERTIFICATE OF CORRECTION

Page 1 of 2

PATENT NO. : 5,400,339
DATED : March 21, 1995
INVENTOR(S) : Sekine et al

It is certified that error appears in the above-indentified patent and that said Letters Patent is hereby corrected as shown below:

Title Page, item [57] Abstract, line 1, delete "connecting" and insert --connected-- line 2, insert --,-- after "line" (first occurrence)

line 8, delete "unit" and insert --units--.

Column 3, line 43, delete "What" and insert --what--.

Column 5, line 29, insert --$T_{11}$-- after "subscriber".

Column 7, line 19, delete "discarding the" and insert --discards--.

Column 7, line 25, delete the paragraph indentation.

Column 7, line 40, delete "," after "0" and insert --.--.

Column 8, line 45, delete "is" and insert --to--

Column 9, line 50, delete "passage-admit-ted" and insert --passage-admitted--.

Column 11, line 9, delete "e,crc/2/'" and insert -- ②'--.

Column 12, line 63, delete "," and insert --.--.

Column 13, line 6, delete "a" and insert --each--.

UNITED STATES PATENT AND TRADEMARK OFFICE
CERTIFICATE OF CORRECTION

PATENT NO. : 5,400,339
DATED : March 21, 1995
INVENTOR(S) : Sekine, et. al.

It is certified that error appears in the above-indentified patent and that said Letters Patent is hereby corrected as shown below:

Column 13, line 12, delete ",a".

Signed and Sealed this

First Day of August, 1995

Attest:

BRUCE LEHMAN

*Attesting Officer*     *Commissioner of Patents and Trademarks*